US011796346B2

(12) United States Patent
Huett et al.

(10) Patent No.: US 11,796,346 B2
(45) Date of Patent: Oct. 24, 2023

(54) ODOMETER SYSTEM FOR A RECREATIONAL VEHICLE

(71) Applicant: DA ROUGE PTY LTD ATF DA ROUGE UNIT TRUST., Campbellfield (AU)

(72) Inventors: Andrew Huett, Campbellfield (AU); Senoll Kaptan, Campbellfield (AU)

( * ) Notice: Subject to any disclaimer, the term of this patent is extended or adjusted under 35 U.S.C. 154(b) by 296 days.

(21) Appl. No.: 16/649,807

(22) PCT Filed: Sep. 24, 2018

(86) PCT No.: PCT/AU2018/000185
§ 371 (c)(1),
(2) Date: Mar. 23, 2020

(87) PCT Pub. No.: WO2019/056048
PCT Pub. Date: Mar. 28, 2019

(65) Prior Publication Data
US 2021/0164802 A1 Jun. 3, 2021

(30) Foreign Application Priority Data

Sep. 22, 2017 (AU) ................. 2017903871

(51) Int. Cl.
| G01C 22/00 | (2006.01) |
| B60K 35/00 | (2006.01) |
| G01C 7/04 | (2006.01) |
| G01S 19/13 | (2010.01) |
| G01S 19/42 | (2010.01) |
| G07C 5/00 | (2006.01) |
| G07C 5/08 | (2006.01) |
| G01C 23/00 | (2006.01) |

(52) U.S. Cl.
CPC .............. *G01C 22/00* (2013.01); *B60K 35/00* (2013.01); *G01C 7/04* (2013.01); *G01S 19/13* (2013.01); *G01S 19/421* (2013.01); *G07C 5/008* (2013.01); *G07C 5/085* (2013.01); *B60K 2370/164* (2019.05); *B60K 2370/178* (2019.05); *G01C 23/00* (2013.01)

(58) Field of Classification Search
CPC ... B60Q 9/008; B60R 19/483; B60R 21/0134; G01S 7/41; G01S 13/931; G01S 2013/9321; G01S 2013/93272; G08G 1/166
See application file for complete search history.

(56) References Cited

U.S. PATENT DOCUMENTS 3,353,404 A 11/1967 Swift
4,313,347 A 2/1982 Hull
(Continued)

*Primary Examiner* — Yuen Wong
(74) *Attorney, Agent, or Firm* — Edwin D. Schindler

(57) ABSTRACT

A usage recordal system for a towed vehicle includes a distance measurement sensor for measuring data representative of distance travelled by the towed vehicle, a road surface quality sensor for measuring data representative of road surface quality for the measured distance travelled by the towed vehicle, and a processor for receiving the data representative of distance travelled by the towed vehicle and the data representative of road surface quality for the measured distance travelled by the towed vehicle and for combining the data to provide data indicative of the distance travelled by the towed vehicle over a variety of road surface conditions.

15 Claims, 6 Drawing Sheets

(56) References Cited

U.S. PATENT DOCUMENTS

| | | | | |
|---|---|---|---|---|
| 6,011,827 A | * | 1/2000 | Kyrtsos | G01C 22/02 |
| | | | | 377/16 |
| 2012/0053805 A1 | * | 3/2012 | Dantu | B60W 40/09 |
| | | | | 701/70 |
| 2014/0182959 A1 | | 7/2014 | Stebbins et al. | |
| 2014/0324248 A1 | * | 10/2014 | Huntzicker | B60D 1/24 |
| | | | | 701/1 |
| 2016/0366815 A1 | * | 12/2016 | Guyette | A01B 69/007 |
| 2017/0169626 A1 | | 6/2017 | Thomsen | |
| 2017/0221069 A1 | | 8/2017 | Remboski | |
| 2017/0307378 A1 | * | 10/2017 | Bobye | G01S 19/48 |

* cited by examiner

Electric Drum Brake
(Outer Drum not shown)

| Date | Defined Service Interval (km) | Service undertaken (km) | Works/Notes | Who |
|---|---|---|---|---|
| 1/1/2017 | 5,000 ⊛ | 5,067 | 1. Faulty brake wire RHS – replaced<br>2. Air conditioner noisy (customer) – Check and operational in condition | Bob Brownless |
| | 10,000 ⊛ | | | |
| | 20,000 ⊛ | | | |
| 30/8/2017 | 30,000 ⊛ | 35,634 | 1. Solar Regulator melted/replaced<br>2. Air conditioner noisy (customer) – Check and operational in condition<br>3. Customer complains of "smell" – No smell during inspection | Jenny Block |

Fig. 6

ODOMETER SYSTEM FOR A RECREATIONAL VEHICLE

RELATED APPLICATIONS

The present application claims priority from Australian provisional patent application no. 2017903871 file 22 Sep. 2017, the entire contents of which are incorporated herein by reference.

FIELD OF INVENTION

The present invention relates generally to vehicles such as caravans, camper trailers, trailers and the like, which are towed by a vehicle.

BACKGROUND OF THE INVENTION

Recreational vehicles, such as caravans and camper trailers, are a popular form of portable accommodation used by many as an economic and enjoyable way in which to experience the outdoors in an independent and comfortable manner. Such vehicles are typically configured to be towed behind a car or truck and may be unhitched from the towing vehicle at the destination to be set up as an accommodation site in accordance with the user's personal preferences.

With an increase in the popularity and availability of off-road vehicles, it is possible for individuals to successfully traverse many roads and terrains which were previously not possible with conventional two wheel drive passenger vehicles. This has resulted in the need for campers to access terrain that was previously not possible and to experience remote regions that have been rarely visited. As a result of this, in recent times there has been a significant shift towards developing and providing recreational vehicles which can be towed behind off-road vehicles and which are capable of traversing difficult terrain such that they can be used at the destination to provide comfortable and convenient accommodation. These developments have involved significant changes in the undercarriage structure of the RV vehicle being towed, to provide sufficient suspension and clearance to ensure that the towed recreational vehicle does not experience damage during transit.

As a direct result of this change in structure and purpose of many recreational vehicles, there are considerably more parts fitted within the caravan and to the undercarriage of the recreational vehicles, such as suspension struts, dampers, shock absorbers, advanced mechanical and electronic control systems and the like. Each of these enhanced systems require constant monitoring and maintenance to ensure that they operate in the manner as desired. Failure to maintain and service such parts can often result in failure of the parts which could be problematic if that failure occurs at a remote location where access to replacement parts or repair services is difficult.

Traditionally, recreational vehicles are generally towed behind a towing vehicle and there has generally not been a need to provide an odometer system to monitor the distance travelled by the recreational vehicle. Owners of such recreational vehicles typically make an assessment to service or maintain the recreational vehicle based on preparing the vehicle for an upcoming trip. However, as the technology employed in such recreational vehicles becomes more developed, there is a need for owners of such vehicles to be more proactive and to begin monitoring time intervals between services and a means to determine whether such recreational vehicles have been exposed to difficult or extreme conditions, which may warrant the need to monitor or service the recreational vehicle at more regular intervals.

Further to this, as there is a significant market in the resale of used recreational vehicles, there exists no current means to determine an appropriate resale value based on distances travelled and conditions endured. In this regard, it is obvious that the resale value of a caravan that has been engineered for off-road conditions but endured continued and excessive off-road use, possible beyond the design intent, will yield a larger depreciation to that of an on-road caravan that has for its intended purpose, traversed smooth sealed roads.

Further, there is also a need to have a consisted and trusted service environment for servicing towed vehicles based on the distance and type of terrain travelled to provide consistency between service intervals to maximise vehicle safety and performance.

Thus, there is a need to provide a system and method for monitoring, recording and displaying the distance and the type of terrain travelled by a recreational vehicle.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

A usage recordal system for a towed vehicle comprising:
  a distance measurement sensor for measuring data representative of distance travelled by the towed vehicle;
  a road surface quality sensor for measuring data representative of road surface quality for the measured distance travelled by the towed vehicle; and
  a processor for receiving the data representative of distance travelled by the towed vehicle and the data representative of road surface quality for the measured distance travelled by the towed vehicle and for combining said data to provide data indicative of the distance travelled by the towed vehicle over a variety of road surface conditions.

In one embodiment, the processor is able to determine service intervals for performing maintenance services on the towed vehicle based on the distance travelled by the towed vehicle over the variety of road surface conditions. The service intervals may be determined based on the distance travelled by the towed vehicle and the road surface quality of the distance travelled.

The processor may further comprise a positioning system that generates positioning data of the distance travelled by the towed vehicle and the location of the road surface quality of the distance travelled. The positioning system may comprise a GNSS receiver that generates autonomous geospatial positioning data of the towed vehicle through multiple satellite systems. The GNSS receiver may also further generate distance and speed data of the towed vehicle.

In another embodiment, the distance measurement sensor may comprise a wheel rotation sensor mounted to at least one of the wheels of the towed vehicle for measuring partial or full wheel rotation. The processor may receive a number of partial or full wheel rotations over time and calculates the speed and distance travelled by the towed vehicle.

The road surface quality sensor may comprise at least one accelerometer mounted to a body of the towed recreational vehicle to measure axial movement of the chassis with respect to the road surface. The at least one accelerometer may be mounted to a chassis of the towed recreational vehicle to measure axial movement of the chassis with respect to the road surface.

A secondary road surface quality sensor may be provided for measuring data representative of road surface energy loss for the measured distance travelled by the towed recreational vehicle. The secondary road surface quality sensor may be mounted to a roof of the towed vehicle and the data representative of road surface energy loss may be represented by the difference in data measured between the road surface quality sensor and the secondary road surface quality sensor. Both the road surface quality sensor and the secondary road surface quality sensor may be accelerometers.

The axial movement of the chassis with respect to the road surface may be recorded by the processor against the distance travelled by the towed recreational vehicle.

The processor may be connectable to a cloud computer network for transferring the combined data thereto for distribution or analytical review. The processor may be connectable to the towing vehicle to transfer the combined data to a driver thereof to alert said driver of detected towing conditions. The detected towing conditions may include change in load conditions, excessive vibrations in towing vehicle and other relevant driving conditions.

The processor may be connectable to the towing vehicle via a mobile transmitting device to wirelessly transmit said data for presentation to the driver of the towing vehicle.

Accordingly, in one aspect of the present invention there is provided a method of collecting and displaying usage data for a towed recreational vehicle comprising:
  generating data representative of distance travelled by the towed recreational vehicle;
  collecting data representative of road surface quality for the distance travelled by the towed recreational vehicle;
  combining the data representative of the distance travelled by the towed recreational vehicle with data representative of road surface quality for the distance travelled by the towed recreational vehicle in real time to provide data indicative of the distance travelled by the caravan in a variety of road surface conditions; and
  supplying the combined data to one or more system users to provide information as to the usage of the towed recreational vehicle and/or the road surface quality.

BRIEF DESCRIPTION OF THE DRAWINGS

The invention may be better understood from the following non-limiting description of preferred embodiments, in which:

FIG. 6 is an example service history report capable of being provided in accordance with an embodiment of the present invention.

DETAILED DESCRIPTION

The present invention will be described below in relation to its application to a caravan of the type that is towed by a vehicle. However, it will be appreciated that the present invention could be equally employed in any variety of towed vehicles, including semi-trailers, recreational vehicles and camper trailers that are to be towed by a vehicle and still fall within the scope of the claims of the present invention.

Figure 1:
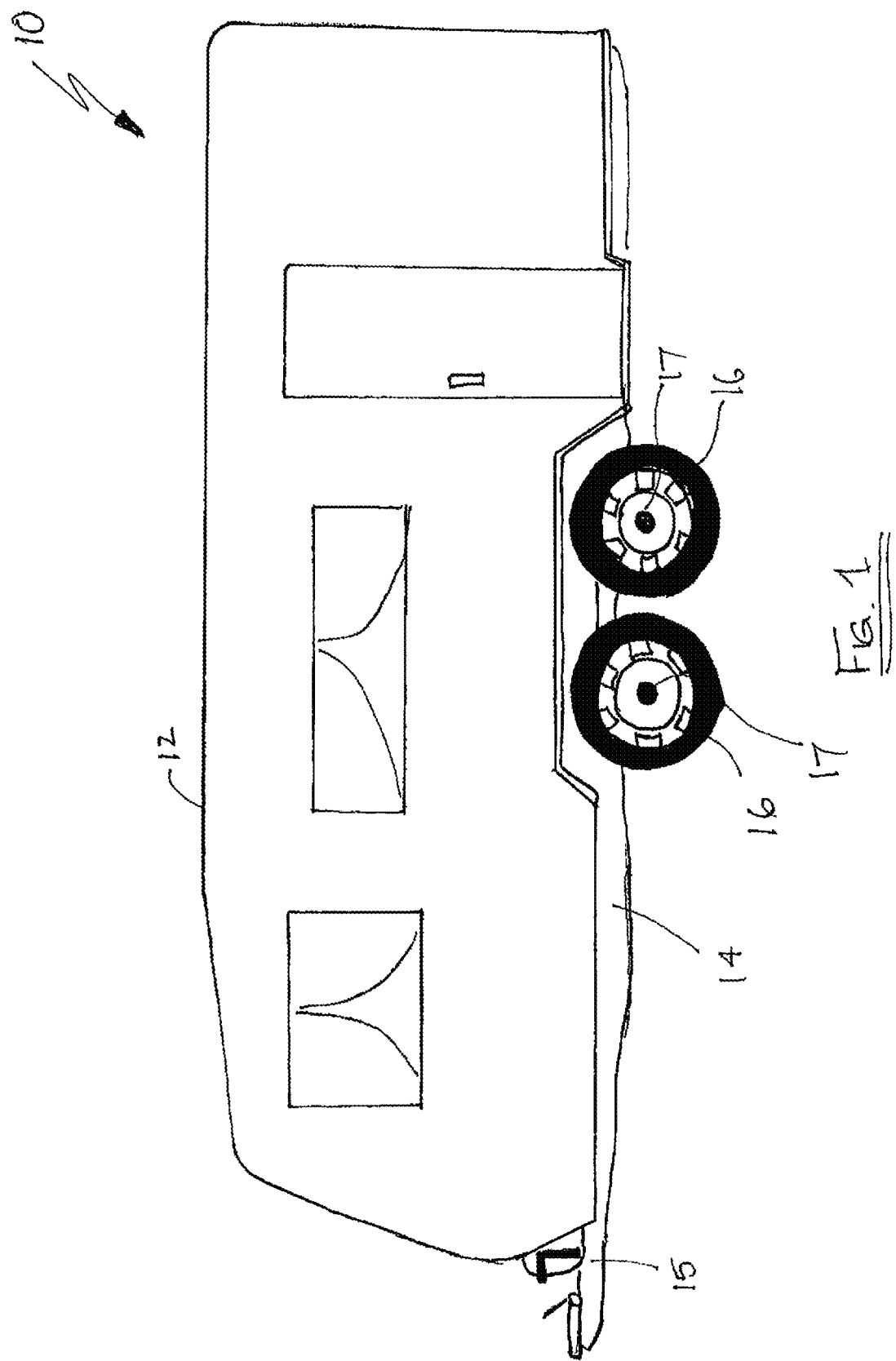
FIG. 1 is a side view of caravan suitable for use with the present invention.

Referring to FIG. 1, a caravan 10 is depicted for application of the present invention in accordance with an embodiment thereof. The caravan 10 is of a conventional type and comprises a chassis 14 that supports a body 12. The body 12 forms an enclosure over the top of the chassis 14 and is configured to function as a mobile accommodation space as is well known in the art. A hitch 15 is attached to a front end of the chassis 14. The hitch 15 attaches to a tow ball or similar arrangement of the towing vehicle (not shown) and may be configured in a variety of different ways so as to provide secure attachment to the towing vehicle as well as the transfer of control signals from the towing vehicle to the caravan 10 so as to operate the turning signals of the caravan 10 and various other functions as would be well understood by those skilled in the art.

In the embodiment as shown, the chassis 14 is supported above a ground surface by way of a pair of wheels 16 mounted upon a pair of axles 17 that extend across the chassis 14. Each of the wheels 16 are mounted on opposing ends of the axles 17 and each of the wheels 16 are free to rotate on the axle 17 under the towing force supplied by the towing vehicle.

Whilst not specifically shown, the wheels 16 may be mounted to the chassis by way of shock absorbers or struts and the axles 17 may comprise independent suspension systems so as to minimise transferral of undesired forces to the caravan to avoid damage to the caravan, especially during traversal across rough terrain.

Figure 2:
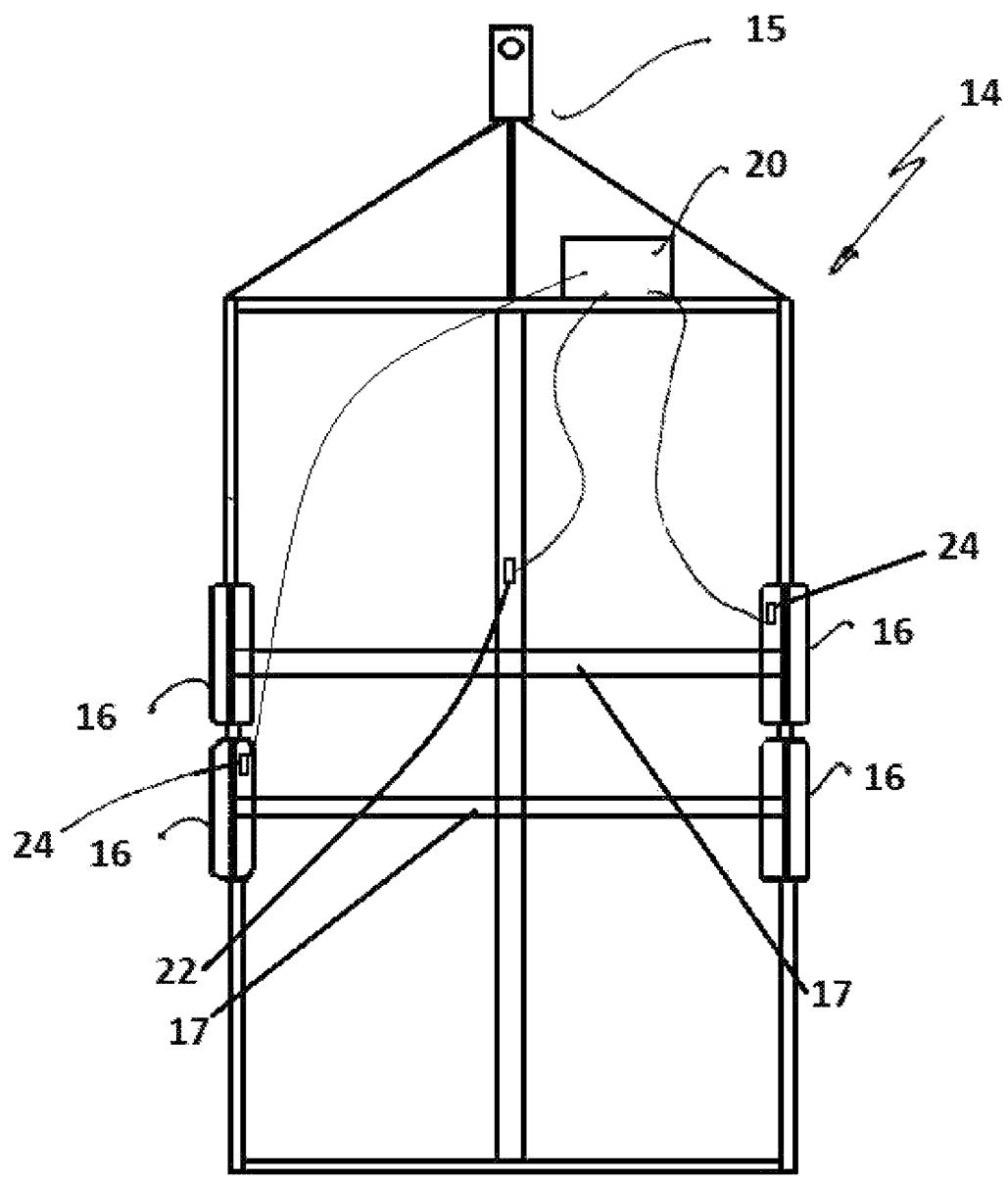
FIG. 2 is a top view of a chassis of the caravan of FIG. 1 depicting the features of the system of the present invention fitted thereto.

Referring to FIG. 2, the chassis 14 is depicted in isolation. A computer system 20 is mounted with respect to the caravan 10 and is able to communicate wirelessly, or in a wired manner, with a variety of sensors provided on the chassis 14 and body 12 of the caravan so as to measure and record a variety of functions in accordance with the present invention. The computer system 20 may be mounted on an external wall of the caravan, in the roof of the caravan or inside the caravan, depending on the design of the caravan.

An accelerometer 22 is mounted on the body of the chassis 14, to measure axial movement of the chassis 14 with respect to the road surface. In the embodiment as shown, the accelerometer 22 is mounted on the central axis of the chassis 14. However, it will be appreciated that multiple accelerometers 22 may be mounted at various points of the chassis 14 to measure axial movement of different regions of the chassis with respect to the road surface. In other embodiments the sensors 22, may be mounted at other points on the caravan 10, such as in the suspension, floor of the caravan or roof of the caravan. Whilst reference is made to the sensor being an accelerometer, it will be appreciated that the sensor could be any form of sensor capable of measuring axial movement. The purpose of the sensor 22 is to provide an indication of the terrain that the caravan 10 is traveling along such that the computer 20 is able to categorise the terrain in terms of its impact on the chassis 14 of the caravan and the suspension of the caravan. This enables road corrugation to be categorised in relation to its adverse impact on the shock absorbers of the caravan, so that the amount of work the suspension system and the shock absorbers have done can be captured. This information can be provided to the driver of the towing vehicle via the present system of the invention such that the driver can pull-over and stop driving to allow the shock absorbers to cool down before they enter a failure mode.

The sensor 22, when mounted on the roof of the caravan 10, may also be used to indicate the energy absorption characteristics of the caravan. The difference between the road surface energy measured by the sensor placed on the caravan chassis or suspension system and the energy which is measured in the roof of the caravan provides an indication of the energy absorbed by the caravan, which is a measurement of damage being undertaken by the caravan.

A distance sensor 24 may be mounted within the wheel hub of one or more of the wheels 16. The distance sensor 24 will be described in more detail below but functions to detect either partial or full wheel rotation and to transmit the data to the computer 20 for recordal and processing. In the embodiment as shown, two distance sensors 24 are mounted in the hubs of wheels 16, on opposing sides of the chassis 14. However, it will be appreciated that the number and location of the distance sensors 24 can vary as appreciated by those skilled in the art.

The computer 20 may include a GNSS receiver that provides autonomous geo-spatial positioning data of the caravan through multiple satellite systems. The ability to receive signals from multiple satellite signals provides improved accuracy over rational GPS and ensures availability and a degree of redundancy. This GNSS receiver enables the computer 20 to determine the positional location of the caravan at all times and to record such data together with the readings taken of the quality of the road surface by the relevant sensors. The computer may alternatively include a Satellite Based Augmentation System (SBAS) or real time kinematic (RTK) system that employ ground stations working in combination with satellite systems to improve accuracy of the measurement system.

The computer 20 is able to store data as it is received and to align data with other received data to provide a multifaceted recordal of each trip made by the caravan. The non-volatile and encrypted memory of the computer 20 is able to store wheel rotation data received from the distance sensors 24 and road surface readings received from the sensors 20. This data can then be cross referenced against the GNSS data being downloaded in real time, which has the capacity to extrapolate caravan speed and distance for further comparison and cross-check.

The computer 20 is able to either communicate in a wired or a wireless manner with each of the sensor systems to enable the system to be readily configured and to facilitate connection with a smart phone or the like to download and review data. The computer 20 may also comprise a display, such as an LCD for displaying basic information such as an odometer reading as well as basic service data indicating time/distance until next service is due.

Figure 3:
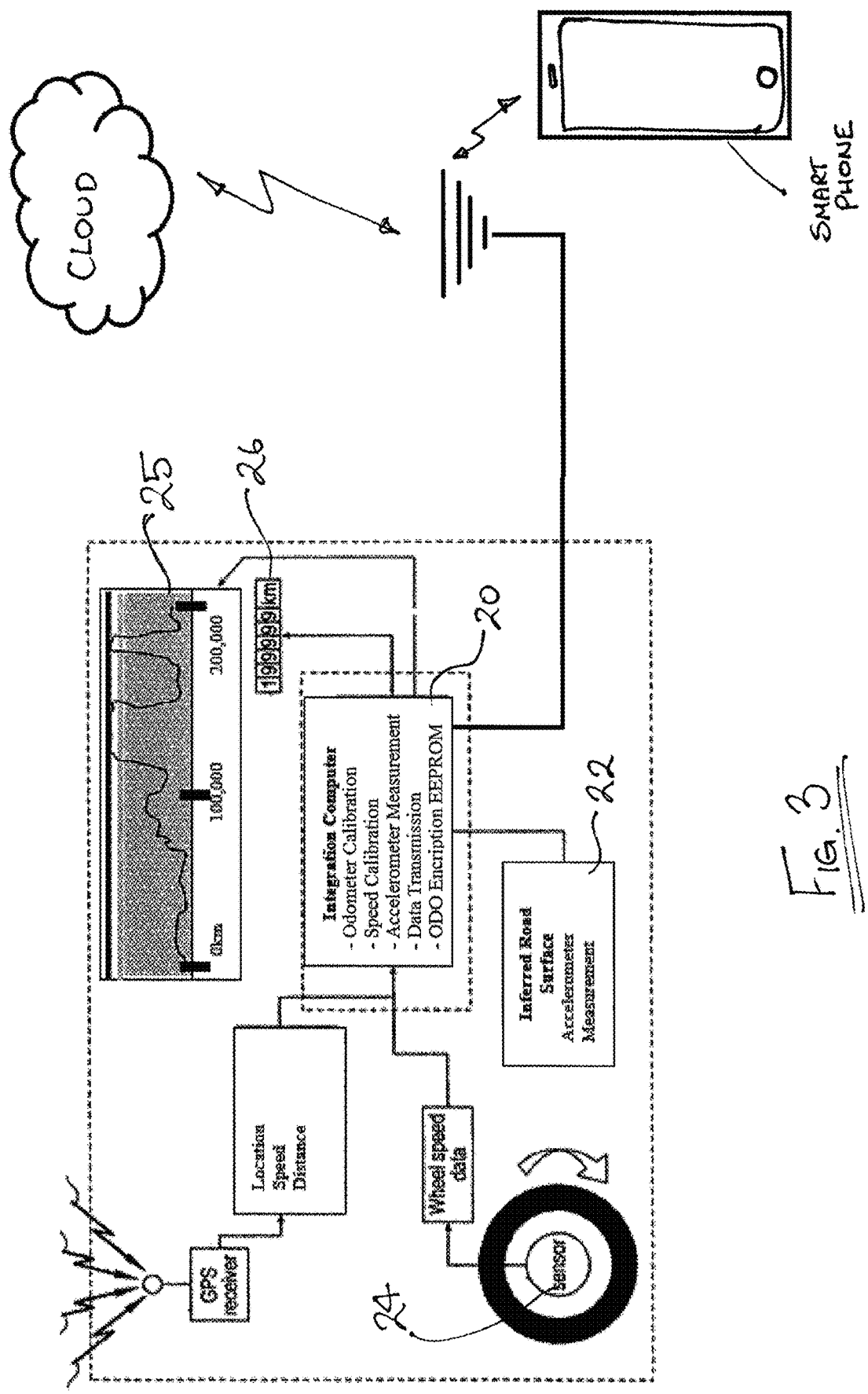
FIG. 3 is a system diagram depicting the components of the present invention and how they interact.

The manner in which the computer 20 is able to configure the data from the system is depicted in FIG. 3. As shown, whilst the caravan is in motion, the computer 20 is able to use the data being received by the GNSS receiver to assess speed, location and distance travelled. The distance sensor 24 is also constantly sending data to the computer 20 measured directly from the wheel(s) 16 of the caravan. The data supplied by the distance sensor 24, namely the number of wheel rotations per a given period of time, can be readily used to calculate the speed and distance travelled by the caravan when the dimensions of the wheel are known, which can be measured against the data received from the GNSS receiver for error correction purposes.

The road surface sensor 22 will collect data associated with axial movement of the chassis or suspension 14 which can then be processed by the computer 20 through the application of a dampening mechanism to generate a measurement of road surface integrity or 'ground truth'. This road surface integrity/ground truth measurement can then be plotted against distance travelled by the caravan as is shown in the plot 25 of FIG. 3. This plot can then be used to provide the user with a visual indication of the state of the road and where and for how long the road surface condition exceeded acceptable engineering limits and generated chassis movements outside a safe range. The plot 25 may provide bands to indicate where the detected chassis movement is in a safe/acceptable/unacceptable/dangerous range. The computer may also provide a standard odometer reading of the combined distance travelled by the caravan in those ranges, as depicted by the reading 26 in FIG. 3.

Figure 4:
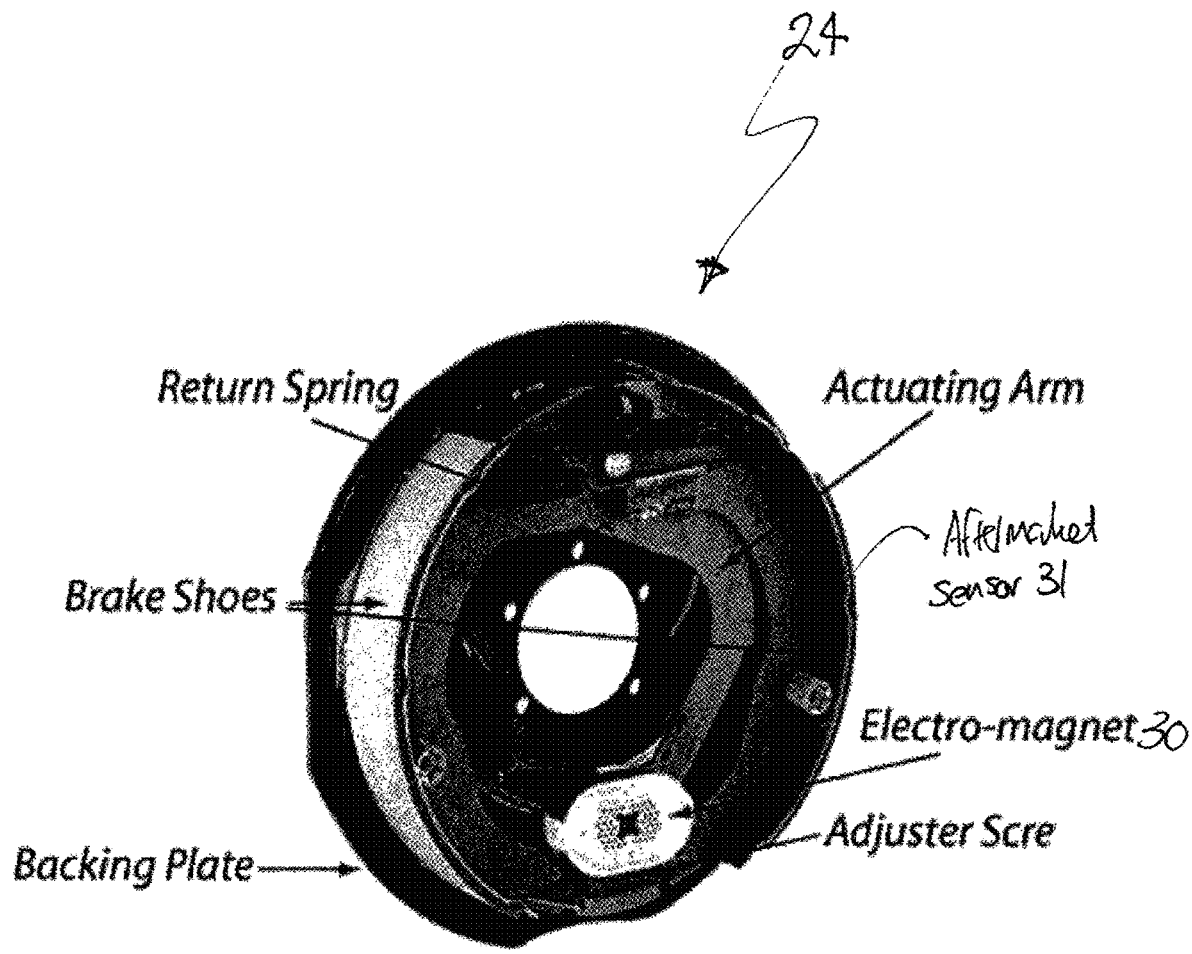
FIG. 4 is a perspective view of an embodiment of the present invention for determining wheel revolutions for use in distance calculations.

One embodiment depicting the manner in which the distance sensor 24 may be configured to collect rotational information of the wheel 16 of the caravan is depicted in FIG. 4. This embodiment utilises the existing electric brake hub present on the wheel 16, which is fitted with an aftermarket sensor or magnet 30. In a conventional drum brake the inner drum is fitted with an electro-magnet 30 as depicted. As the wheel 16 rotates, magnetised wheel studs, magnet/s or magnetised drum present in the wheel will interact with the electro-magnet 30 to induce a signal which can be collected by a coil in the brake line. In another depiction, a magnetic field generated by the electro-magnet could be distorted by the passing of wheel studs, magnet/s or magnetised drum, thus, each time the wheel rotates the detected signal will be recorded by the computer 20 as a full or partial wheel rotation. As the diameter of the wheel 16 is known, the distance can be readily calculated together with the speed of the wheel. Such a simple means for collecting data can be simply and effectively used by the system as a measure of distance travelled, as well as speed.

Figure 5:
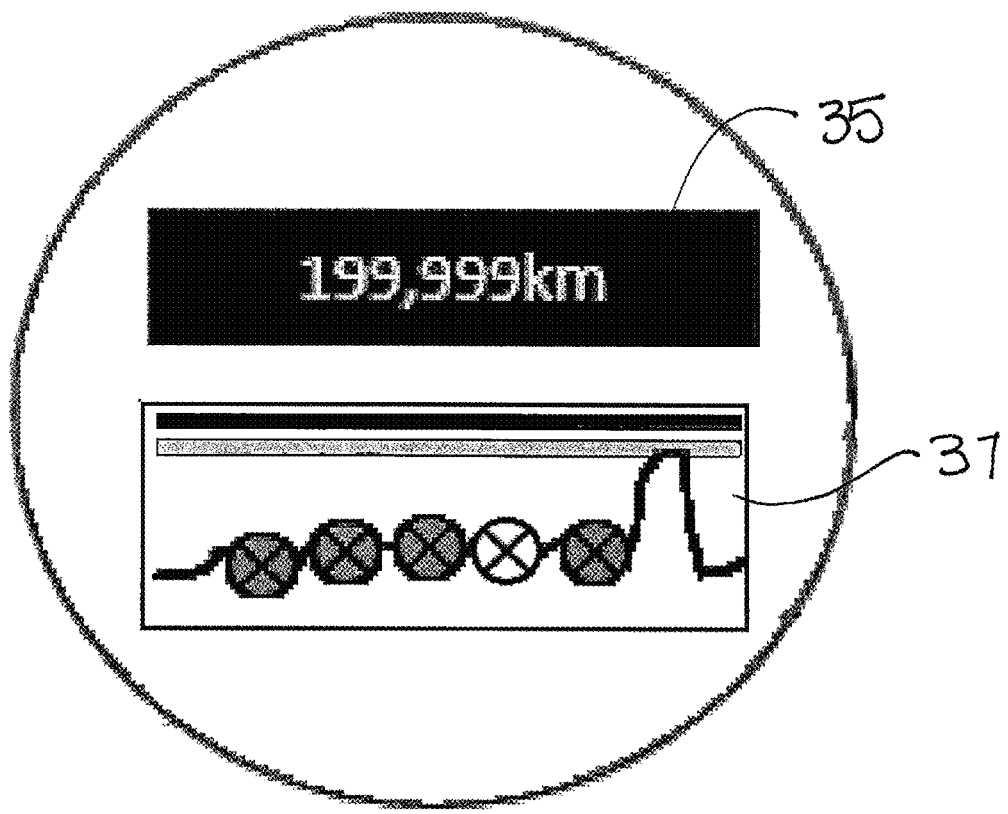
FIG. 5 is an illustration on an embodiment of a display for the computer of the present system.

The computer 20 may be located within the caravan 10, with a display of the computer readily accessible. In a preferred from, the display of the computer 20 may be configured in the manner as depicted in FIG. 5. The distance travelled is depicted in appropriate format 35. In the embodiment as shown, the format is in kms although the format may also be displayed in miles if required by the user. In this form, the caravan user, or a prospective buyer of the caravan, can readily see the physical distance travelled by the caravan.

The computer display may comprise a second display 37 that provides the user/prospective buyer with an indication of the service history and type of terrain covered over the distance travelled. A line graph is depicted having a number of circles present thereon. These circles are representative of scheduled service intervals for the caravan. Those circles shown in grey depict that the service was completed, with the white circle indicating that the service was scheduled but not completed. In this regard, an important part of servicing the caravan requires the servicing body accessing the computer 20 and completing the service history. This provides a user of the caravan important information as to when the next service should be scheduled and provides a prospective buyer with service history information which can be used to determine the state of the caravan.

The second part 37 of the display also provides information about the terrain travelled by the caravan over the distance, referred to as the ground truth report. This is depicted by the line graph as shown, with the upper bars depicting terrain where the stresses placed on the chassis of the caravan is in a "caution zone" and an "excessive zone" respectively. These zones can be determined based on make/model/capability of the caravan and are based on the recommended loads to be applied to the chassis of the caravan as set by the manufacturer. As the system of the present invention takes measurements via the accelerometer 22, these forces can be collected and recorded over time in a simple and effective manner and stored as part of the odometer reading. Once again, the user is able to readily determine how much work the caravan has done since the last service and if the caravan has been used in difficult terrain, they may choose to bring that service forward if the distance travelled has been in any of these ranges. Similarly, a prospective buyer of the caravan is able to obtain an indication of the use of the vehicle when assessing the purchase price by entering in the VIN number from the caravan to access this information.

It will be possible for a user to interrogate the computer 20 or retrieve equivalent data from the internet cloud to obtain a more detailed reading of the service history of the caravan. This could be displayed on the computer's screen or may communicate with a software application installed on a smart phone or similar electronic device to display the information on the electronic device. FIG. 6 depicts an embodiment of a type of report that can be obtained. This report identifies the date of the service, the scheduled service and the distance travelled by the caravan at each scheduled interval. Additional information indicating the type of work undertaken and the name of the service provider is also shown.

It will be appreciated that the system and method of the present invention provides a simple and effective means for capturing data associated with the use of the caravan for use in maintaining the caravan and for providing a means for determining true depreciated value of the caravan based on its actual use. By providing not only a means for measuring distance travelled by the caravan but also by providing a means for recording the types of road surfaces that the caravan has travelled on, appropriate servicing of the caravan can be undertaken based on the strain and stresses that the caravan has been subjected to over its life. This information can be used by owners, prospective buyers or aggregated to an internet cloud platform for distributed use providing users of caravans with the most up to date information at their disposal to make appropriate decisions about the care and safety of their caravan.

It will be appreciated that the information collected by the system and method of the present invention can be used to on-sell or provide customers with usage history of the caravan whereby the customer is able to simply visit a web hosted site and Enter the VIN details of the caravan or trailer and see the usage history of the vehicle. Such information availability will enable manufacturers to gain a better insight into what owners of off-road caravans really do in their caravans with such information being able to be used for warranty purposes. Such information can also be provided to insurance agencies to determine premiums, and can be supplied to councils and governments to provide an indication of the condition of the roads they are managing and where repairs to the road are required. By providing access to collected information from all users, customers are able to use the information in their trip planners so that they can determine the road conditions before directly experiencing them, giving them the option of taking alternative routes where desired.

Information will also be made available to drivers of the towing vehicle as they are in transit. This provides the driver direct feedback of the towing conditions. In this regard, the computer processor will be provided with a database of maximum performance standards for the various aspects of the caravan such that when the sensors process data in real time that correlates to performance standards that when compared to the stored performance standards fall outside the maximum limits, alerts can be issued to the driver to modify the driver's behaviour.

Also, by measuring road condition and the location of those conditions it is possible to determine a "Road Truth" test standard. This information can be supplied to chassis manufacturers to ensure that the chassis being constructed are capable of withstanding such real road conditions. Similarly, such known road surface conditions can be used to determine suspension performance and thus resultant vibration energy transferred to chassis. The metrics of which are input into the ODO computer at time of manufacturing based on suspension type (springs, wheels etc) and ATM, GTM, and ball weight.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. An odometer system for indicating that a towed vehicle requires maintenance service, comprising:
   a distance measurement sensor for measuring data representative of distance travelled by the towed vehicle;
   a road surface quality sensor for measuring data representative of road surface quality for the measured distance travelled by the towed vehicle, said road surface quality sensor comprising an accelerometer mounted to a chassis of the towed vehicle for measuring axial movement of the chassis with respect to the road surface;
   a secondary road surface quality sensor for measuring data representative of road surface energy loss for the measured distance travelled by the towed vehicle;
   a computer for recording the data representative of distance travelled by the towed vehicle and the data representative of road surface quality for the measured distance travelled by the towed vehicle; a processor for providing data indicative of the distance travelled by the towed vehicle over a variety of road surface conditions; and,
   the computer for indicating when maintenance service of the towed vehicle is due based upon distance travelled by the towed vehicle over a variety of road surface conditions to thereby service the towed vehicle when maintenance service of the towed vehicle is indicated to be due.

2. The odometer system for indicating that a towed vehicle requires maintenance service according to claim 1, wherein the processor determines service intervals for performing maintenance services on the towed vehicle based on the distance travelled by the towed vehicle over the variety of road surface conditions.

3. The odometer system for indicating that a towed vehicle requires maintenance service according to claim 2, wherein the service intervals are determined based on the distance travelled by the towed vehicle and the road surface quality of the distance travelled.

4. The odometer system for indicating that a towed vehicle requires maintenance service and servicing the towed vehicle according to claim 1, further comprising a positioning system that generates positioning data of the distance travelled by the towed vehicle and the location of the road surface quality of the distance travelled.

5. The odometer system for indicating that a towed vehicle requires maintenance service according to claim 4, wherein the positioning system comprises a GNSS receiver that generates autonomous geo-spatial positioning data of the towed vehicle through multiple satellite systems.

6. The odometer system for indicating that a towed vehicle requires maintenance service according to claim 5, wherein the GNSS receiver further generates distance and speed data of the towed vehicle.

7. The odometer system for indicating that a towed vehicle requires maintenance service according to claim 1, wherein the distance measurement sensor comprises a wheel rotation sensor mounted to at least one wheel of the towed vehicle for measuring partial or full wheel rotation.

8. The odometer system for indicating that a towed vehicle requires maintenance service according to claim 7, wherein the processor receives a number of partial or full wheel rotations over time and calculates the speed and distance travelled by the towed vehicle.

9. The odometer system for indicating that a towed vehicle requires maintenance service according to claim 1, wherein the secondary road surface quality sensor is mounted to a roof of the towed vehicle and the data representative of road surface energy loss is represented by a difference in data measured between the road surface quality sensor and the secondary road surface quality sensor.

10. The odometer system for indicating that a towed vehicle requires maintenance service according to claim 9, wherein both the road surface quality sensor and the secondary road surface quality sensor are accelerometers.

11. The odometer system for indicating that a towed vehicle requires maintenance service according to claim 1, wherein the axial movement of the chassis with respect to the road surface is recorded by the processor against the distance travelled by the towed vehicle.

12. The odometer system for indicating that a towed vehicle requires maintenance service according to claim 1, wherein the processor is connectable to a cloud computer network for transferring the data for distribution or analytical review.

13. The odometer system for indicating that a towed vehicle requires maintenance service according to claim 1, wherein the processor is connectable to a towing vehicle to transfer the data to a driver thereof to alert said driver of detected towing conditions.

14. The odometer system for indicating that a towed vehicle requires maintenance service according to claim 13, wherein the detected towing conditions include changes in load conditions in the towed vehicle and excessive vibrations in the towing vehicle.

15. The odometer system for indicating that a towed vehicle requires maintenance service according to claim 13, wherein the processor is connectable to the towing vehicle via a mobile transmitting device to wirelessly transmit said data for presentation to the driver of the towing vehicle.

* * * * *